United States Patent
Singh et al.

(10) Patent No.: US 11,236,277 B1
(45) Date of Patent: Feb. 1, 2022

(54) DIVIDING WALL COLUMN IN A FLUID CATALYTIC CRACKING GAS PLANT FOR NAPHTHA ABSORPTION, STRIPPING, AND STABILIZATION SERVICE

(71) Applicants: Bhari Bhujan Singh, Slough (GB); Ian Charles Elgey, Slough (GB)

(72) Inventors: Bhari Bhujan Singh, Slough (GB); Ian Charles Elgey, Slough (GB)

(73) Assignee: KELLOGG BROWN & ROOT LLC, Houston, TX (US)

( * ) Notice: Subject to any disclaimer, the term of this patent is extended or adjusted under 35 U.S.C. 154(b) by 0 days.

(21) Appl. No.: 16/951,417

(22) Filed: Nov. 18, 2020

(51) Int. Cl.
| | |
|---|---|
| C10G 70/04 | (2006.01) |
| B01D 3/14 | (2006.01) |
| C10G 70/06 | (2006.01) |
| C10G 53/02 | (2006.01) |
| C10G 5/06 | (2006.01) |
| B01D 5/00 | (2006.01) |

(52) U.S. Cl.
CPC ............ *C10G 70/041* (2013.01); *B01D 3/141* (2013.01); *B01D 5/006* (2013.01); *C10G 5/06* (2013.01); *C10G 53/02* (2013.01); *C10G 70/06* (2013.01); *C10G 2300/1044* (2013.01)

(58) Field of Classification Search
CPC .... C10G 70/00; C10G 70/041; C10G 70/043; C10G 70/06; C07C 7/005; C07C 7/04; C07C 7/09; C07C 7/11; B01D 3/141
See application file for complete search history.

(56) References Cited

U.S. PATENT DOCUMENTS

| | | | | |
|---|---|---|---|---|
| 5,015,364 A * | 5/1991 | Harandi | .................. | C10G 5/04 208/208 R |
| 5,709,780 A | 1/1998 | Ognisty et al. | | |
| 5,755,933 A | 5/1998 | Ognisty et al. | | |
| 7,462,277 B2 * | 12/2008 | Adrian | ..................... | B01D 3/40 208/115 |
| 9,724,619 B2 | 8/2017 | Bhargava et al. | | |
| 2001/0044565 A1 | 11/2001 | Keady et al. | | |
| 2012/0138509 A1 * | 6/2012 | Ulas Acikgoz | ........ | C10G 11/18 208/100 |
| 2012/0141333 A1 * | 6/2012 | Ulas Acikgoz | ........ | B01D 3/141 422/187 |
| 2014/0231238 A1 | 8/2014 | Bhargava et al. | | |
| 2015/0211790 A1 | 7/2015 | Bhargava et al. | | |

OTHER PUBLICATIONS

Zhu, Frank et al., Hydroprocessing for Clean Energy: Design, Operation, and Optimization; Chapter 9, pp. 242-243 (Year: 2017).*

* cited by examiner

*Primary Examiner* — Renee Robinson
(74) *Attorney, Agent, or Firm* — Gary M. Machetta

(57) ABSTRACT

Methods and systems for recovering naphtha blend stock from hydrocarbons produced in a fluid catalytic cracking (FCC) process. In particular, the disclosure concerns gas plants for an FCC process, wherein the gas plant uses a dividing wall column. The dividing wall column essentially performs the functions that are performed in a traditional FCC gas plant by three different columns, namely, a primary absorber, a stripper, and a debutanizer.

24 Claims, 8 Drawing Sheets

DIVIDING WALL COLUMN IN A FLUID CATALYTIC CRACKING GAS PLANT FOR NAPHTHA ABSORPTION, STRIPPING, AND STABILIZATION SERVICE

FIELD OF THE INVENTION

This application relates to a gas plant used in a fluid catalytic cracking system, and more particularly to methods and systems include a dividing wall column.

INTRODUCTION

Fluid catalytic cracking (FCC) is an important and well-known commercial conversion process used in petroleum refineries to convert high-boiling, high-molecular-weight hydrocarbon molecules in crude oil into high value products, such as propylene, cat-cracked naphtha, and middle distillates. An FCC process typically involves three main sections—a cracking unit (which comprises a reactor/regenerator), a main fractionator, and a gas plant section (also known as a vapor recovery unit (VRU) or gas concentration unit (GCU)). FIG. 1 shows a block flow diagram overview of typical FCC unit having a gas plant 100. A high molecular weight feed is fed to a catalytic cracking unit (i.e., the reactor/regenerator). The feed can be, for example, heavy atmospheric gas oils, vacuum gas oils, and/or residue. The feed is vaporized and cracked into smaller molecules via the catalytic cracking reaction. The reactor effluent is provided to a main fractionator. The liquid products from the main fractionator can include heavy naphtha, light cycle oil (LCO), and heavy cycle oil (HCO). Slurry may also be produced as a bottom product. Wild naphtha from the main fractionator may be provided directly to the primary absorber column of the gas plant. The overhead stream of the main fractionator is provided to the gas plant.

The details of a typical gas plant and the components illustrated in FIG. 1 are described in more detail below. But what should be gleaned from FIG. 1 is that a typical gas plant comprises three major columns—a stripper, a primary absorber, and a debutanizer, which are shown in bold boxes in FIG. 1. The gas plant also includes further columns for providing finer separations between components. The overhead products from the main fractionator (and the wild naphtha from the main fractionator) comprises a number of components, including ethane and lighter components, propane, butane, pentane, C6 components, and C7 components. The purpose of the gas plant is to separate the various components, for example, to provide gasoline (which is primarily C5+ material, though it can contain some C4).

There is a continued need in the art for improving gas plants used in catalytic cracking operations, for example, by decreasing the equipment count and space requirements and improving the capital costs (CAPEX) and operating costs (OPEX) of the operation.

SUMMARY

Disclosed herein is a method for recovering naphtha blend stock from hydrocarbons produced in a fluid catalytic cracking (FCC) process, the method comprising: compressing a wet gas from the FCC process, wherein the wet gas comprises C2-C5+ materials, fractionating the compressed wet gas to provide a vapor portion and a liquid portion, combining the vapor portion and the liquid portion in a dividing wall column, wherein: the dividing wall column comprises: a vertical dividing wall dividing a top section of the column into a pre-fractionator section and a main fractionator upper section that is contiguous with a main fractionator lower section configured below the vertical dividing wall, wherein the vapor portion and the liquid portion are combined in the pre-fractionator section, fractionating the combined vapor portion and liquid portion in the pre-fractionator section to provide a C2− enriched overhead stream and a C3+ enriched fraction, feeding the C3+ enriched fraction to the main fractionator lower section, fractionating the C3+ enriched fraction in the main fractionator lower section and main fractionator upper section to provide an C3/C4 enriched overhead stream and a C5+ enriched bottoms stream, recycling a first portion of the C5+ enriched bottoms stream to the pre-fractionator section, and recovering a second portion of the C5+ enriched bottoms stream as the naphtha blend stock. According to some embodiments, the method further comprises providing wild naphtha from a main fractionator of the FCC process to the pre-fractionator section. According to some embodiments, feeding the C3+ enriched fraction to the main fractionator lower section comprises heating the C3+ enriched fraction against the C5+ enriched bottoms stream in a side reboiler. According to some embodiments, the method further comprises cooling the C3/C4 enriched overhead stream to provide a cooled C3/C4 enriched material, returning a first portion of the cooled C3/C4 enriched material to the main fractionator upper section, and providing a second portion of the cooled C3/C4 enriched material to a liquified petroleum gas (LPG) treating facility. According to some embodiments, fractionating the C3+ enriched fraction comprises reboiling a portion of the C3+ enriched fraction from a bottom tray of the dividing wall column in a first reboiler and returning the reboiled C3+ enriched fraction to a sump of the dividing wall column. According to some embodiments, the first reboiler heats the portion of the C3+ enriched fraction against lower-grade main fractionator pumparound from the FCC process. According to some embodiments, the method further comprises heating a portion of the C3+ enriched fraction from the sump against high-grade main fractionator pumparound from the FCC process in a second reboiler. According to some embodiments, the method further comprises chilling the first portion of the C5+ enriched bottoms stream before recycling it to the pre-fractionator section. According to some embodiments, the method further comprises fractionating the C2− enriched overhead stream in a secondary absorber column to provide a further enriched C2− fraction as an overhead stream and a C3+ enriched fraction as a bottom stream. According to some embodiments, the method further comprises providing the further enriched C2− fraction to a fuel gas treating facility and providing the C3+ enriched fraction to a main fractionator of the FCC process. According to some embodiments, there is no condenser connected to the pre-fractionator section. According to some embodiments, there is only a single condenser connected to the dividing wall column, wherein the single condenser is connected to the main fractionator upper section.

Also disclosed herein is a system for recovering naphtha blend stock from hydrocarbons produced in a fluid catalytic cracking (FCC) process, the system comprising: a compressor configured to compress a wet gas from the FCC process, wherein the wet gas comprises C2-C5+ materials, a separator drum configured to fractionate the compressed wet gas to provide a vapor portion and a liquid portion, a dividing wall column comprising a vertical dividing wall dividing a top section of the column into a pre-fractionator section and a main fractionator upper section that is contiguous with a main fractionator lower section configured below the vertical dividing wall, wherein the system is configured so that: the vapor portion and the liquid portion are combined in the pre-fractionator section, the combined vapor portion and liquid portion are fractionated in the pre-fractionator section to provide a C2− enriched overhead stream and a C3+ enriched fraction, the C3+ enriched fraction is fed to the main fractionator lower section, the C3+ enriched fraction is fractionated in the main fractionator lower section and main fractionator upper section to provide an C3/C4 enriched overhead stream and a C5+ enriched bottoms stream, a first portion of the C5+ enriched bottoms stream is recycled to the pre-fractionator section, and a second portion of the C5+ enriched bottoms stream is recovered as the naphtha blend stock. According to some embodiments, wild naphtha from a main fractionator of the FCC process is provided to the pre-fractionator section. According to some embodiments, the system comprises a side reboiler configured to heat the C3+ enriched fraction against the C5+ enriched bottoms stream before the C3+ enriched fraction is fed to the main fractionator lower section. According to some embodiments, the system comprises a condenser configured to cooling the C3/C4 enriched overhead stream to provide a cooled C3/C4 enriched material, and a reflux drum configured to receive the cooled C3/C4 enriched material, wherein the system is configured to: return a first portion of the cooled C3/C4 enriched material to the main fractionator upper section, and provide a second portion of the cooled C3/C4 enriched material to a liquified petroleum gas (LPG) treating facility. According to some embodiments, the system further comprises a first reboiler configured to heat a portion of the C3+ enriched fraction from a bottom tray of the dividing wall column and return the heated C3+ enriched fraction to a sump of the dividing wall column. According to some embodiments, the first reboiler heats the portion of the C3+ enriched fraction against lower-grade main fractionator pumparound from the FCC process. According to some embodiments, the system further comprises a second reboiler configured to heat a portion of the C3+ enriched fraction from the sump against high-grade main fractionator pumparound from the FCC process in a second reboiler. According to some embodiments, the system further comprises a chiller configured to chill the first portion of the C5+ enriched bottoms stream before recycling it to the pre-fractionator section. According to some embodiments, the system further comprises a secondary absorber column configure to fractionate the C2− enriched overhead stream to provide a further enriched C2− fraction as an overhead stream and a C3+ enriched fraction as a bottom stream. According to some embodiments, the further enriched C2− fraction is provided to a fuel gas treating facility and the C3+ enriched fraction is provided to a main fractionator of the FCC process. According to some embodiments, there is no condenser connected to the pre-fractionator section. According to some embodiments, there is only a single condenser connected to the dividing wall column, wherein the single condenser is connected to the main fractionator upper section.

DETAILED DESCRIPTION

Figure 2:
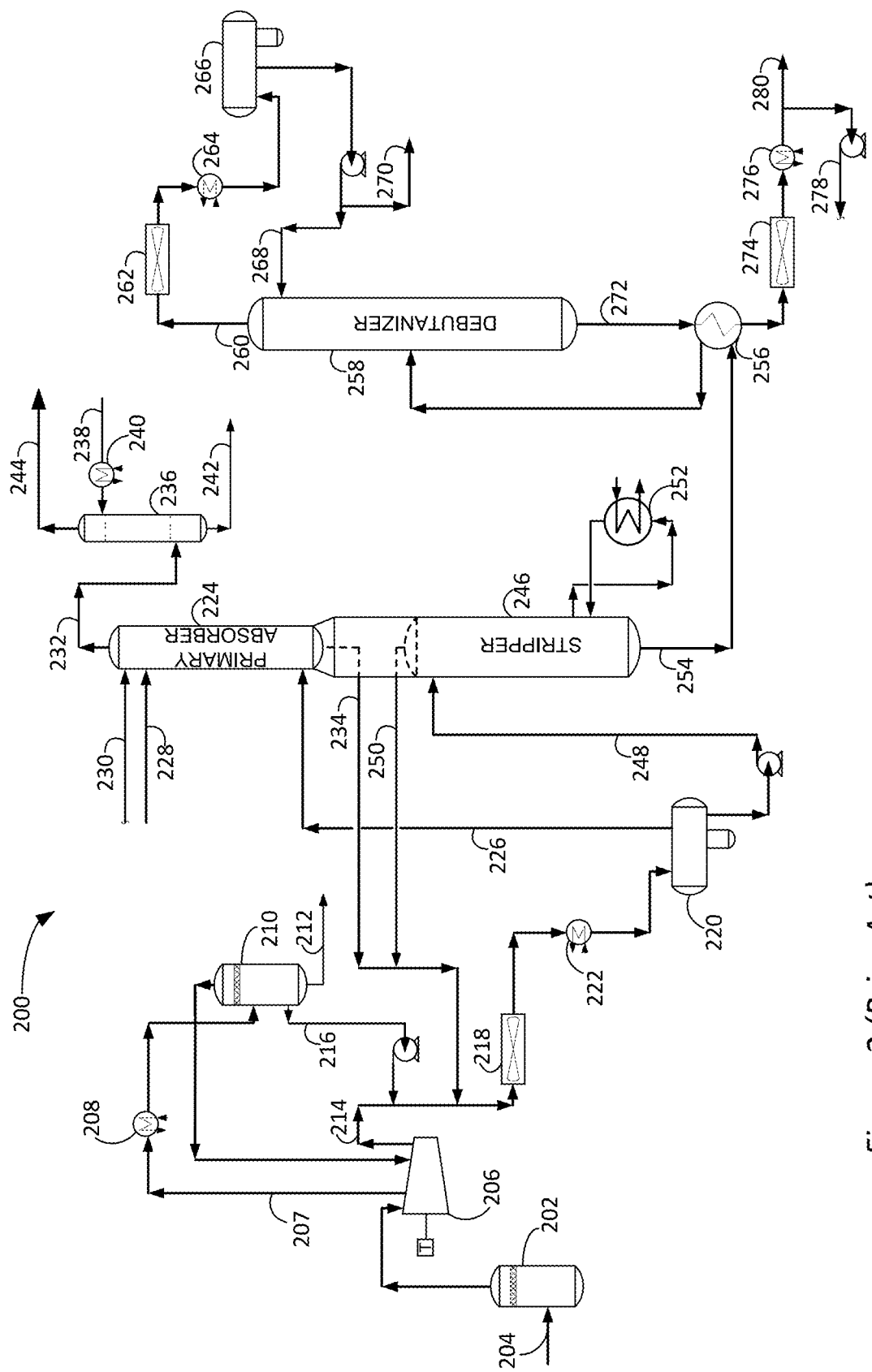
FIG. 2 shows a gas plant in accordance with the prior art.

FIG. 2 shows a more detailed illustration of a typical gas plant 200 used in a catalytic cracking process. It should be noted that some equipment, such as intercoolers, pumps, reboilers, and the like, are omitted from the drawings or are not labeled or discussed if they are not important to an understanding of the illustrated methods and systems. Wet gas from the main fractionator drum is provided to a wet gas compressor suction drum 202 via line 204. The wet gas comprises C2, C3, and C4 components, as well as some C5, and C5+ material. The wet gas is compressed in a wet gas compressor 206, which may be a two-stage centrifugal machine, for example. The vapors from the first stage discharge (line 207) of the compressor may be partially condensed in an inter-stage cooler 208 and flashed in an inter-stage drum 210. The bottoms of the drum 210 may be provided to sour water treatment (line 212). The vapor discharge from the second stage of the wet gas compressor (line 214) may be combined with the liquid from the inter-stage drum (line 216), cooled using a high-pressure cooler 218 and provided to a high-pressure separator drum 220. A high-pressure trim cooler 222 may also be used to cool the feed to the high-pressure separator drum 220. The high-pressure separator drum 220 provides a crude fractionation between light (C2-C4) components in the vapor and heavier (C5+) components in the liquid. It will be appreciated that the vapor will include some amount of heavier components and the liquid will include some amount of light components.

Vapor from the high-pressure separator drum 220 is provided to the bottom of the primary absorber column 224 via line 226. Wild naphtha from the main fractionator is provided to the primary absorber column 224 via line 228 and super lean oil from the debutanizer (discussed below) is provided to the primary absorber column 224 via line 230. The super lean oil (line 230) from the debutanizer is typically introduced to the primary absorber column above the introduction point of the wild naphtha (line 228). According to some embodiments, the wild naphtha feed (line 228) is set by design and cannot be changed. But the lean oil from the debutanizer (line 230) may be a slip stream and may be adjusted. The materials in lines 228 and 230 are cool and heavy and therefore pull heavy components from the materials introduced via line 226, which rise up through the primary absorber column. The overhead stream 232 of the primary absorber column will contain C2 components and some amount of C3 and C4 components. The light components in line 232 may be provided to a secondary absorber column (a.k.a. sponge absorber) 236. The secondary absorber column 236 may be configured to receive lean oil from the main fractionator via line 238. The lean oil may be cooled using a lean oil cooler 240. The lean oil pulls down heavier components in the secondary absorber column and the heavier components may be recycled to the main fractionator as rich sponge oil via line 242. The light components within the secondary absorber column, which are primarily C2− components, may be sent to sour fuel gas treating facilities via line 244. The bottoms of the primary absorber column 224, which comprise mostly C3 and C4 components, are directed back to the high-pressure cooler 218 via line 234.

The liquid from the high-pressure separator drum 220, which is mostly C5+ material (but including some C2, C3, and C4 material) may be provided to the top of the stripper column 246 via line 248. The stripper column 246 removes a portion of the light components (mostly C2- and some C3 and C4) and recycles the light components back to the high-pressure cooler 218 via line 250. The stripper column 246 may include one or more reboilers 252, the duty of which determines the C4– spec of the stripper column bottoms provided to the downstream debutanizer column. One reboiler 252 is illustrated.

The stripper column bottoms (line 254) may be preheated by heat exchange with the debutanizer column bottoms in a heat exchanger 256 and then provided to a debutanizer column (a.k.a. stabilizer column) 258. The debutanizer column overhead stream 260, which comprises mostly C3 and C4 materials, may be cooled using a debutanizer overhead condenser 262 and a debutanizer overhead trim condenser 264 and provided to a debutanizer reflux drum 266. A portion of the debutanizer column overhead can be returned to the debutanizer column (line 268) and the remainder can be sent (line 270) to facilities for treating the liquified petroleum gas (LPG, mostly propane and butane), for example, amine treatment, mercaptan sulfur removal, a depropanizer to separate the C3 from the C4, and separation of the C3s into propylene and propane products. The C4 can go to further processing, gasoline blending or LPG sales.

The debutanizer bottoms (line 272), which is enriched in C5+, is pre-cooled by the heat exchanger 256, a debutanizer bottoms air cooler 274, and a debutanizer bottoms trim cooler 276. A portion of the cooled debutanizer bottoms (line 278) can be returned to the primary absorber 224 as super lean oil (i.e., via line 230) and the remainder (line 280) is yielded as cat-cracked naphtha gasoline blend-stock.

Figure 1:
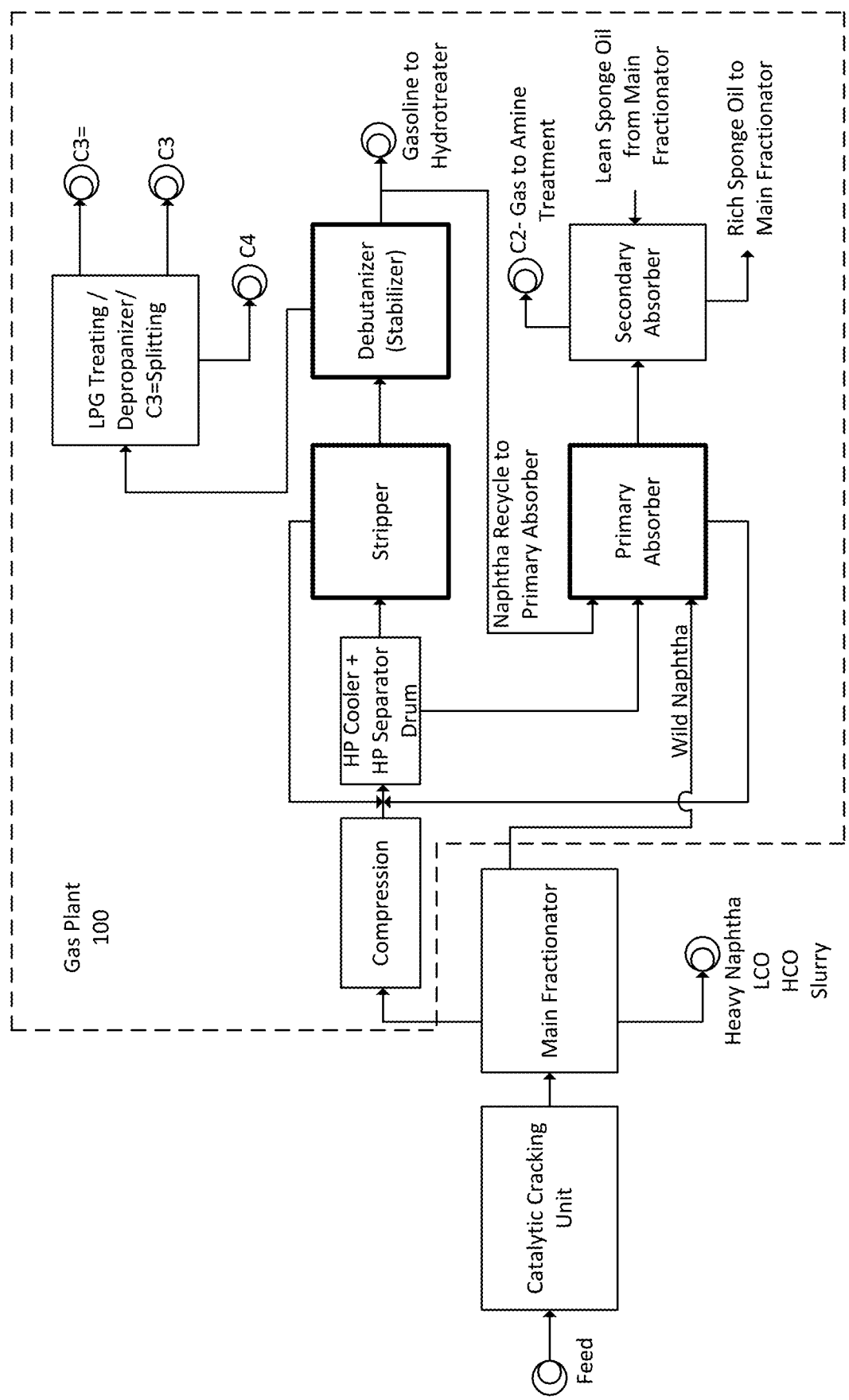
FIG. 1 shows a schematic of a FCC process including a gas plant in accordance with the prior art.
Figure 3:
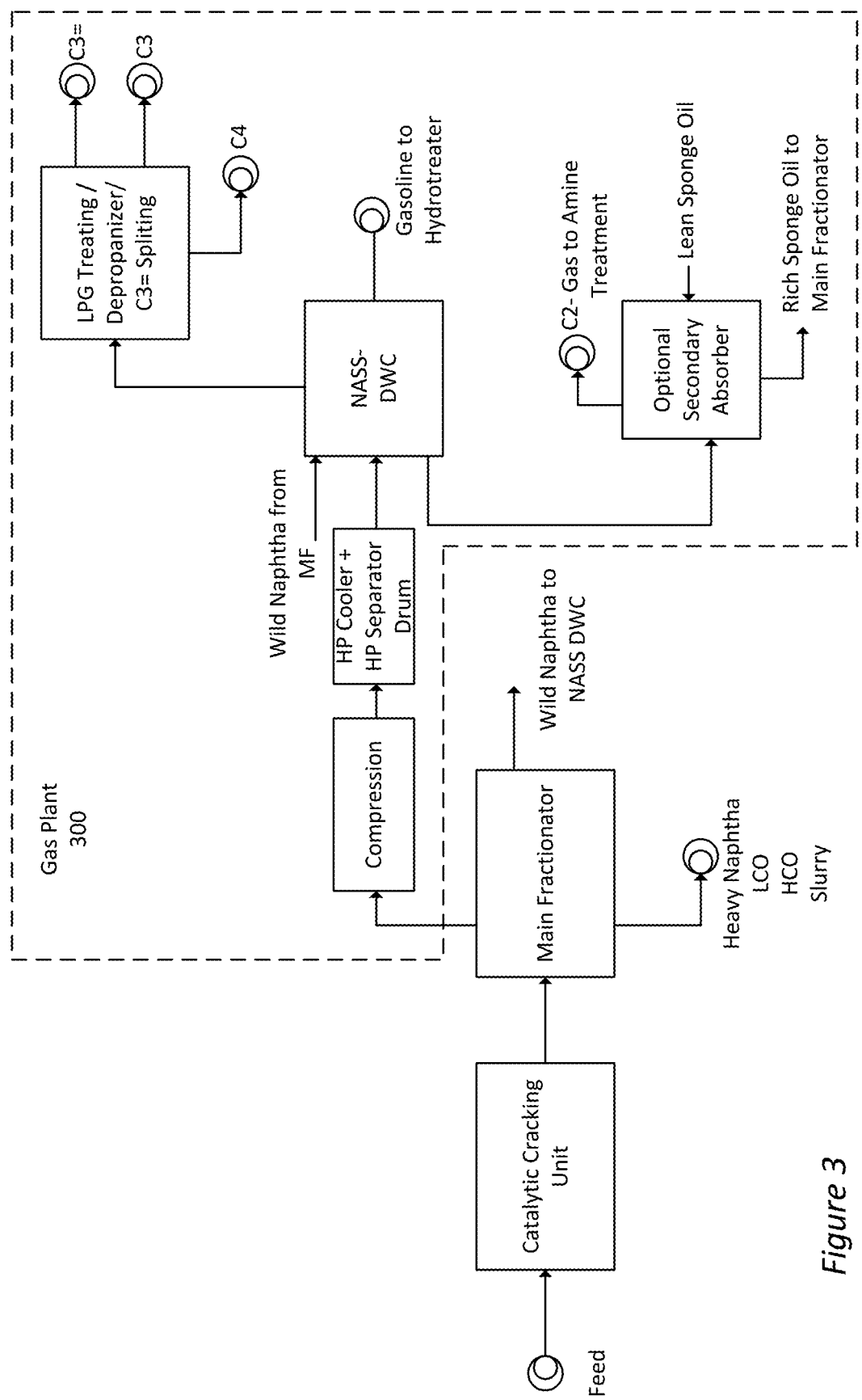
FIG. 3 shows a block flow diagram overview an FCC unit and gas plant incorporating a Naphtha Absorber Stripper Stabilizer—Dividing Wall Column (NASS-DWC).

The inventors have discovered that the FCC gas plant design, as illustrated in FIG. 2, can be greatly simplified by using a dividing wall column that combines the functions of the primary absorber 224, the stripper column 246, and the debutanizer column 258. The dividing wall column is referred to herein as a Naphtha Absorber Stripper Stabilizer—Dividing Wall Column (NASS-DWC). FIG. 3 shows a block flow diagram overview an FCC unit and gas plant incorporating a NASS-DWC in the gas plant. The use of a NASS-DWC greatly simplifies the flow scheme in the gas plant 300, compared to the gas plant 100, as illustrated in FIGS. 1 and 2. As described in more detail below, the NASS-DWC uses a single condenser but is still able to improve or maintain the propylene recovery, the C2- and C5+ spec in the LPG products, and the C4 spec in the cat-cracked naphtha, while requiring lower capital costs (CAPEX) and operating costs (OPEX) than the conventional FCC gas plant scheme using three columns. The reduced equipment count and reduction in the equipment sizes helps to reduce the CAPEX and the plot space requirement for the modified FCC gas plant flow scheme. OPEX savings are realized by reducing the requirement for steam, cooling water, and electric power, as well as reducing the maintenance requirements. Note that in the illustrated gas plant 300, the secondary absorber is optional. As explained in more detail below, some embodiments include a secondary absorber and other embodiments do not.

Figure 4:
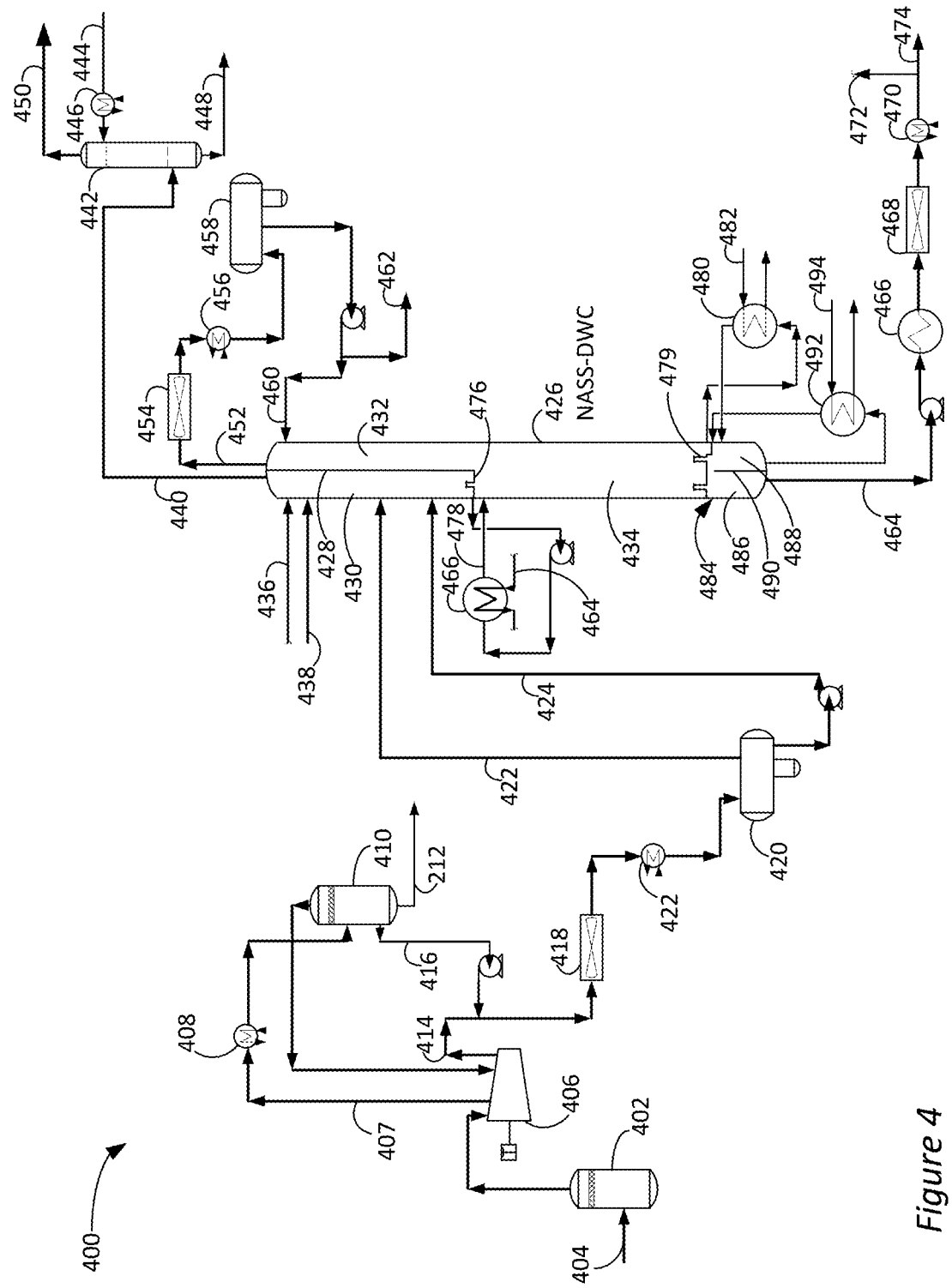
FIG. 4 shows a gas plant incorporating a NASS-DWC.

FIG. 4 illustrates and embodiment of a gas plant 400 incorporating a NASS-DWC. Wet gas from the main fractionator drum is provided to a wet gas compressor suction drum 402 via line 404. As explained above, the wet gas comprises C2, C3, and C4 components, as well as some C5, and C5+ material. The wet gas is compressed in a wet gas compressor 406, which may be a two-stage centrifugal machine, for example. The vapors from the first stage discharge (line 407) of the compressor may be partially condensed in an inter-stage cooler 408 and flashed in an inter-stage drum 410. The bottoms of the drum 410 may be provided to sour water treatment (line 212). The vapor discharge from the second stage of the wet gas compressor (line 414) may be combined with the liquid from the inter-stage drum (line 416), cooled using a high-pressure cooler 418 and provided to a high-pressure separator drum 420. A high-pressure trim cooler 422 may also be used to cool the feed to the high-pressure separator drum 420. The high-pressure separator drum 420 provides a crude fractionation between light (C2-C4) components in the vapor and heavier (C5+) components in the liquid. It will be appreciated that the vapor will include some amount of heavier components and the liquid will include some amount of light components.

Both the vapor portion (line 422) and the liquid portion (line 424) from the high-pressure separator drum 420 is provided to the NASS-DWC 426. The NASS-DWC 426 comprises a dividing wall 428, which divides the top portion of the column into a pre-fractionator section 430 and a main fractionator upper section 432. The lower, undivided portion of the NASS-DWC is referred to herein as the main fractionator lower section 434. The pre-fractionator section 430 generally provides the same separation functionality as the primary absorber and stripper columns of the conventional FCC gas plants (i.e., 224 and 246, FIG. 2). Super lean oil is provided to the pre-fractionator section 430 via line 436 and wild naphtha from the main fractionator overhead drum is proved via line 438. C3+ components contained in the column feeds are recovered in the pre-fractionator section 430 with the super lean oil (adjustable, as described above). C2-components are stripped by the required quantity of vapors routed from the main fractionator lower section 434 to the pre-fractionator section 430. The C2– enriched overhead stream 440 may be routed to a secondary absorber column 442, where the C3+ component recovery (line 448, returned to main fractionator) is increased by contact with heavy naphtha or LCO lean oil (line 444, cooled by cooler 446) from the FCC main fractionator. The secondary absorber column overhead stream 450 is enriched in C2– components and may be amine treated and routed to the refinery fuel gas section. It is important to note that no condenser is required for the overhead stream 440 from the pre-fractionator section 430. The only condenser required for the NASS-DWC is condenser 454, which is connected to the main fractionator upper section 432, as described below. In other words, the NASS-DWC is a single condenser system. It should also be noted that the system works independently of the secondary absorber requirement, as shown in embodiments wherein the secondary absorber column is omitted below.

Notice that in the illustrated embodiments, there is no recycle of liquid or vapor from the NASS-DWC 426 to the high-pressure separator drum 420. In other words, there is no need for recycle line 234 and/or 250 (as shown in FIG. 2). As a result, components of the system, such as the high-pressure condenser 418, the trim cooler 422, and the high-pressure separator drum 420 may all be reduced in size and duty compared to the prior art embodiment illustrated in FIG. 2.

The main fractionator upper section 432 of the NASS-DWC 426 generally performs the function of the rectification section of the conventional debutanizer column (i.e., the upper sections of 258 and associated components of FIG. 2). Overhead vapor (line 452, enriched in C3/C4) of the main fractionator upper section 432 may be condensed using a NASS-DWC overhead condenser 454 and a NASS-DWC trim condenser 456 and provided to a NASS-DWC reflux drum 458. A portion of the contents of the NASS-DWC reflux drum 458 may be returned to the column (line 460) and the balance (line 462) may be routed to an amine absorber for H$_2$S removal and to a mercaptan removal unit to produce sweet LPG (C3/C4).

The main fractionator lower section 434 generally performs the same separation as the stripping section of a conventional debutanizer column (i.e., the lower section of 258 and associated lower components of FIG. 2) to meet the volatility requirements of the naphtha product. According to some embodiments, the heat of bottoms product (line 464) of the main fractionator lower section 434 can be used to provide heat to a NASS-DWC side reboiler 466 (note that the NASS-DWC side reboiler 466 is illustrated twice in FIG. 4, for clarity of process flow). The remaining heat can be removed using an NASS-DWC bottoms air cooler 468 and NASS-DWC bottoms trim cooler 470. A portion of cooled bottoms product (line 472) can be recycled as super lean oil to the NASS-DWC pre-fractionator section (i.e., to line 436) and the remainder (line 474) may be taken as cat-cracked naphtha gasoline blend-stock.

The steam requirement of the modified FCC gas plant may be minimized by heat integrating the NASS-DWC design with the NASS-DWC column bottoms and the FCC main fractionator. For example, in the illustrated gas plant 400, three process reboilers are used in the NASS-DWC to supply the required energy for component separation. The NASS-DWC side reboiler 466 is used to reboil the pre-fractionator section's bottoms tray 476 by heat exchange with the NASS-DWC bottoms stream 464 and the reboiler outlet vapor/liquid (line 478) is returned to the top tray of the NASS-DWC main fractionator lower section. The liquid from the bottom tray 479 of the NASS-DWC main fractionator lower section is partially vaporized in a first NASS reboiler 480 by exchanging heat against the lower-grade main fractionator pumparound (LCO PA) stream (line 482). The vapor portion of the reboiled hydrocarbon travels up in the column and liquid portion is routed to the column sump 484. As the vapors travel up the column, the proportion of vapor that enters the pre-fractionator section 430 versus the main fractionator upper section 432 can be configured based on the trays in the column, as is known in the art.

In the illustrated embodiment, the sump 484 is divided into a product compartment 486 and a reboiler feed compartment 488 by a vertical baffle 490. The liquid portion of the reboiled hydrocarbon from the first NASS reboiler 480 enters the reboiler feed compartment 488. The liquid from the reboiler feed compartment is again reboiled using a second NASS reboiler 492. For example, the second NASS reboiler 492 may operate to reboil the liquid against high-grade main fractionator pumparound (HCO PA) stream (line 494). The second NASS reboiler 492 may be a circulating thermosyphon reboiler, for example. The vapor portion of the reboiled hydrocarbon travels up in the NASS-DWC column while the liquid portion is recirculated to the reboiler feed compartment and a portion of the liquid overflows the baffle 490 to the product compartment. Other heating/reboiling configurations are possible, including the alternative embodiments discussed below.

The operating pressure of the NASS-DWC may be determined by the fuel gas battery limit pressure. The operating pressure of the high-pressure separator drum 420 is set by the NASS-DWC column pressure. At a constant temperature in the high-pressure separator drum 420, a lower operating pressure flashes the light ends (mainly C3-) in the feed and they tend to go with the overhead fuel gas in the NASS-DWC pre-fractionator section. A higher circulating naphtha (super lean oil) flow is required to recover the C3s from the flashed feed. A higher circulating naphtha flow increases the NASS-DWC column traffic and thus increases the required reboiler duty. At a constant high-pressure separator drum temperature and a high operating pressure, C2s tend to go with LPG in the NASS-DWC main fractionator section and a higher reboiler duty is required to recover the C2s in the fuel gas. According to some embodiments, an optimized operating pressure for the NASS-DWC is somewhere between the conventional primary absorber pressure and the conventional debutanizer column pressure. Any reduction achieved in the operating pressure for the NASS-DWC design over the conventional primary absorber operating pressure enables a reduction in the required discharge pressure of the wet gas compressor and thus decreases the shaft horsepower requirement of the system. The NASS-DWC flow scheme reduces the remixing (and associated separation inefficiency) phenomenon compared to the conventional three-column FCC gas plant scheme and realizes the benefits of reduced hydrocarbon inventory. This separation efficiency improvement by the NASS-DWC significantly reduces the size of the high-pressure separator drum and contributes to the CAPEX savings.

Figure 5:
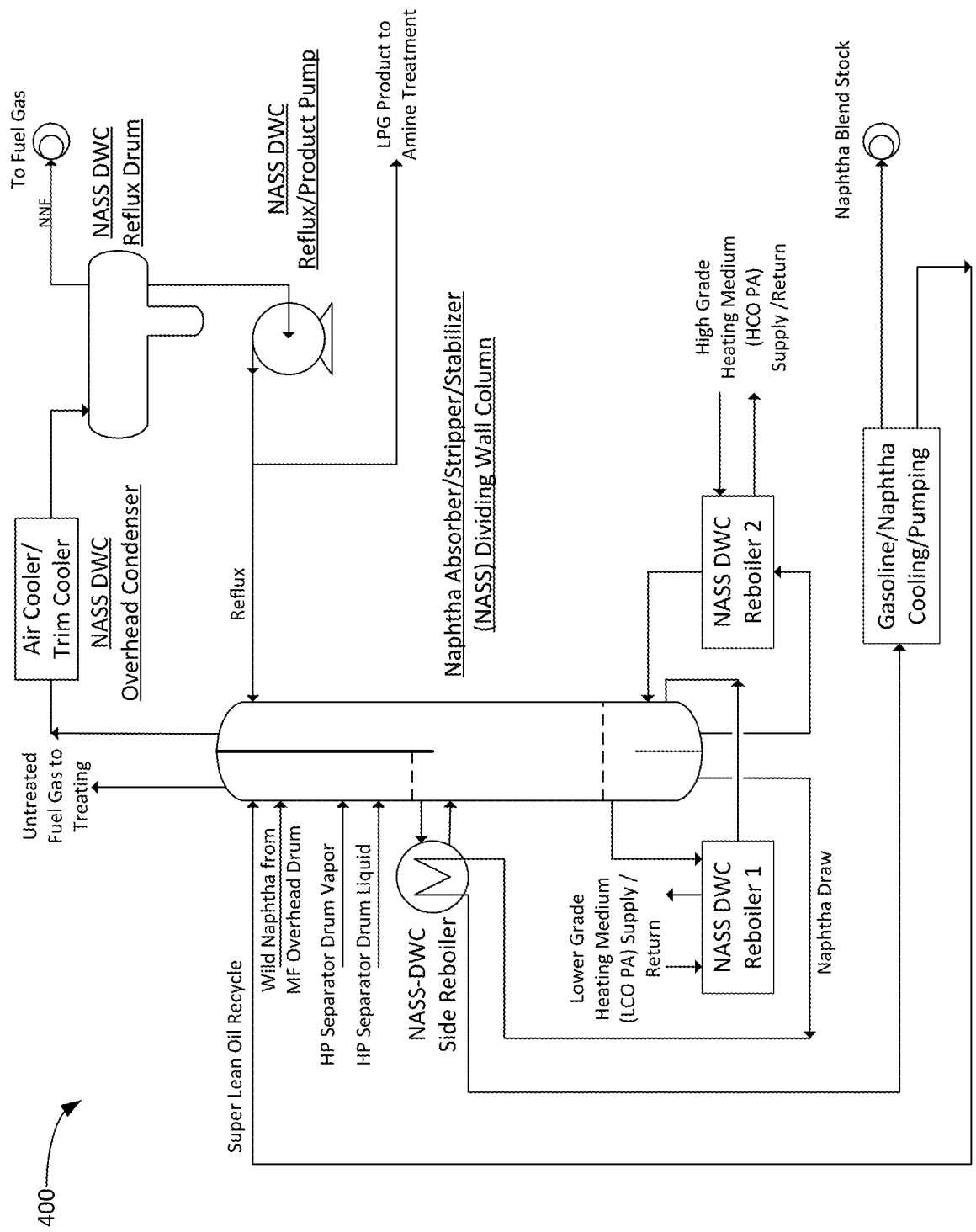
FIG. 5 shows a schematic of a gas plant incorporating a NASS-DWC.
Figure 6:
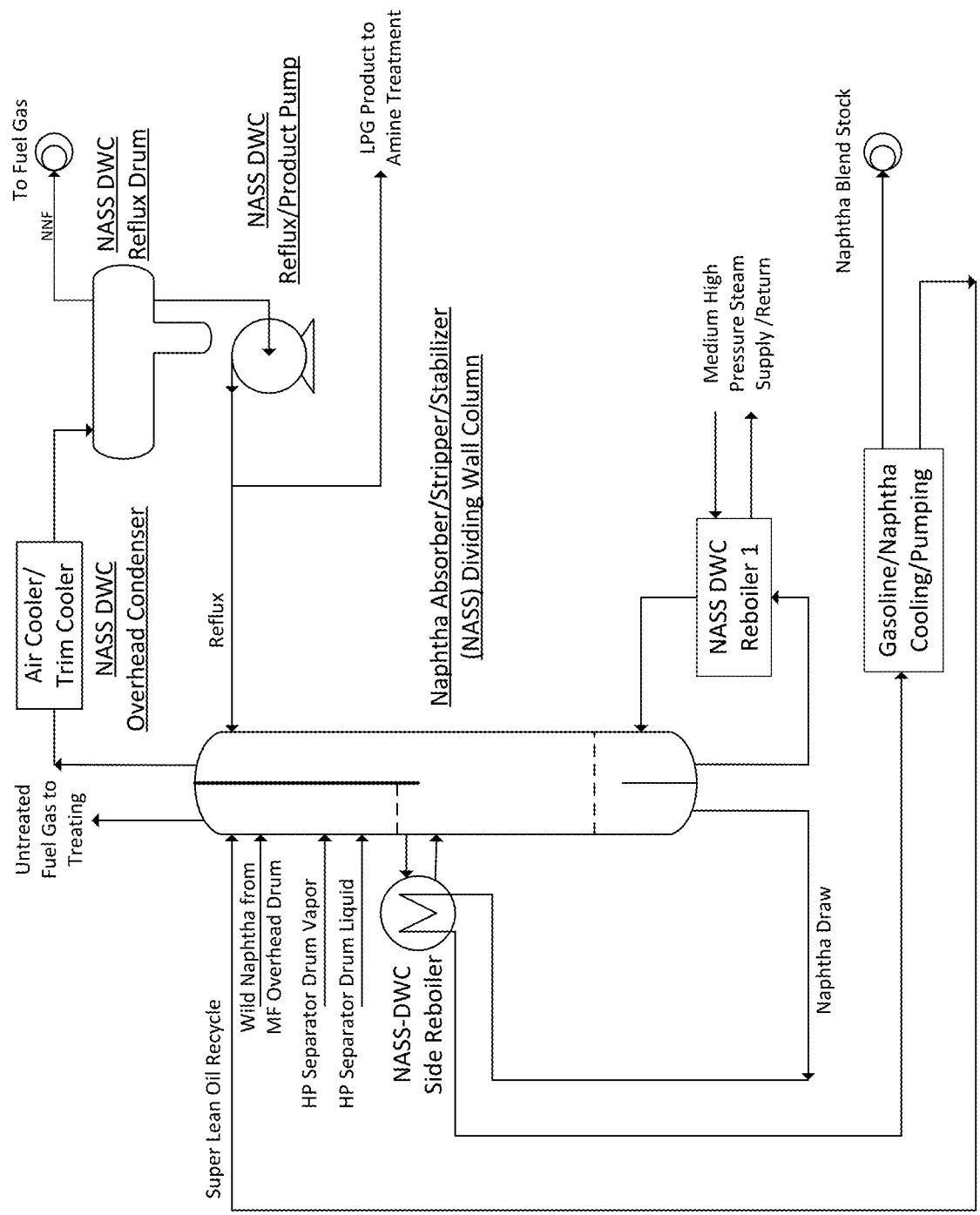
FIG. 6 shows a schematic of an alternative embodiment of a gas plant incorporating a NASS-DWC.
Figure 7:
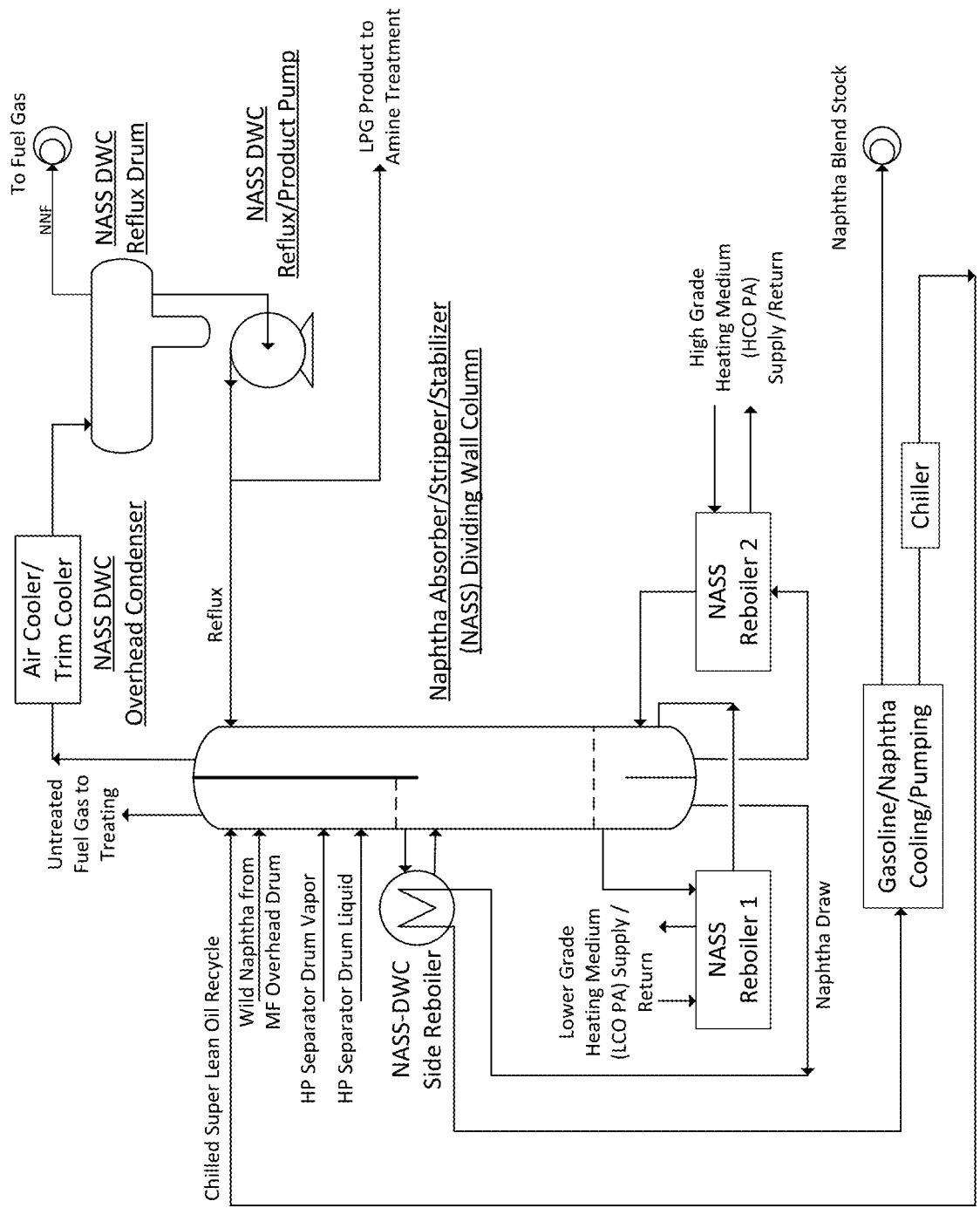
FIG. 7 shows a schematic of a further alternative embodiment of a gas plant incorporating a NASS-DWC.
Figure 8:
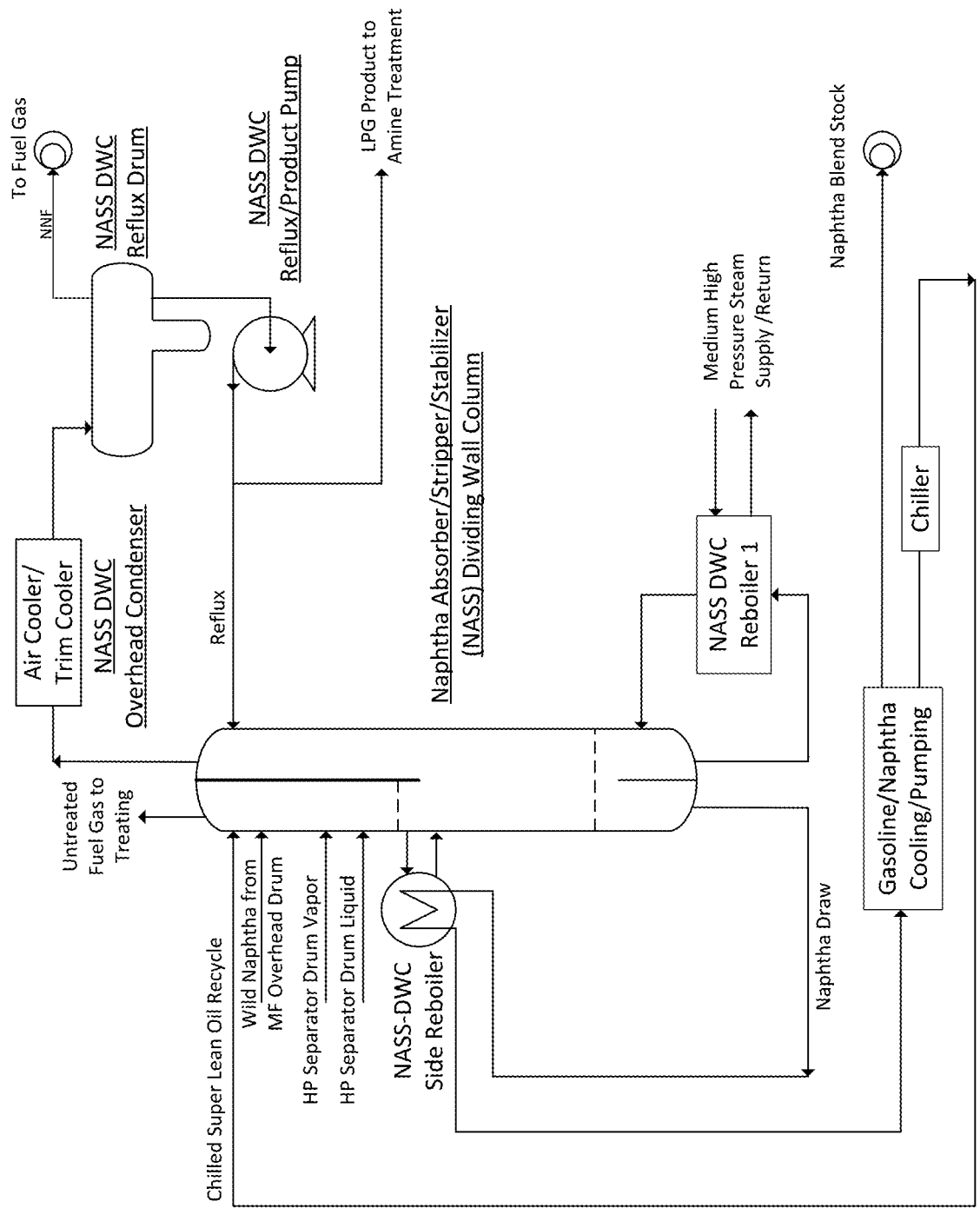
FIG. 8 shows a schematic of a further alternative embodiment of a gas plant incorporating a NASS-DWC.

FIG. 5 provides a schematic of the gas plant 400 including a NASS-DWC according to the discussion above. FIG. 5 is meant to supplement what has already been discussed above, and is therefore not discussed here in detail. Note that the secondary absorber section is omitted in the schematic of FIG. 5. FIG. 6 illustrates an alternative embodiment wherein the required heat duty is supplied by a side reboiler (i.e., the NASS-DWC side reboiler, as in the above embodiments), but wherein the first and second NASS reboilers are replaced by a single NASS-DWC reboiler. The single NASS-DWC reboiler of the FIG. 6 embodiment operates on steam, rather than hi- or low-grade main fractionator pumparound. FIGS. 7 and 8 illustrate embodiments wherein chilled circulating naphtha maintains the C3 recovery. The embodiment illustrated in FIG. 7 is analogous to the one illustrated in FIG. 5, in the sense that it includes both of the NASS reboilers operating on the FCC main fractionator pumparounds. The embodiment illustrated in FIG. 8 is analogous to the one illustrated in FIG. 6, in the sense that it uses a single NASS-DWC reboiler at the bottom of the column operating on steam. In both of the embodiments (FIGS. 7 and 8), chilling the recirculated naphtha reduces the circulating naphtha requirement in the pre-fractionator section of the NASS-DWC. Chilling the recirculated naphtha can provide the following advantages: (1) significant reduction in the required circulating naphtha flow; (2) significant reduction in the required reboiler duty, which, in turn, leads to increased steam production from the FCC unit, more FCC feed preheat and furnace load reduction, and a reduced steam requirement in the FCC unit; (3) reduction of the NASS-DWC diameter; (4) reduced C2s slippage with the LPG stream; and (5) reduced C5 component slippage in the fuel gas, which increases the gasoline production and reduces the lean oil rate to the secondary absorber.

Several embodiments of improving a gas plant for an FCC process by using a dividing wall column (i.e., a NASS- DWC) have been described. It will be apparent to those of skill in the art that other configurations are possible based on the disclosure. It will be appreciated that the disclosed methods and systems provide several technical advantages over the prior art FCC gas plants, including reduction in the required outlet pressure of the wet gas compressor, size reduction of the high-pressure separator drum, improved fractionation efficiency, reduced utility requirements, reduced overall energy requirements, reduced $CO_2$/NOx emissions, and enhanced plant safety due to less hydrocarbon inventory. The disclosed methods and systems provide commercial advantages, including reduced equipment count, less plot space requirements, less capital requirements compared to the conventional three-column scheme (e.g., 20-30% less capital requirement), improvement in fractionation economics, advantages for plant upgrading/debottlenecking, and overall improvement in the value of products. Other advantages of the disclosed methods and systems, compared to various prior art systems, reside in the ability of the disclosed system to be heat-integrated with the FCC process, for example, by using the hi- or low-grade FCC main fractionator pumparound to provide reboiler duty for the NASS-DWC. Also, the disclosed NASS-DWC configurations do not require a condenser integrated with the pre-fractionator section of the NASS-DWC.

Although particular embodiments of the present invention have been shown and described, it should be understood that the above discussion is not intended to limit the present invention to these embodiments. It will be obvious to those skilled in the art that various changes and modifications may be made without departing from the spirit and scope of the present invention. Thus, the present invention is intended to cover alternatives, modifications, and equivalents that may fall within the spirit and scope of the present invention as defined by the claims.

What is claimed is:

1. A method for recovering naphtha blend stock from hydrocarbons produced in a fluid catalytic cracking (FCC) process, the method comprising:
compressing a wet gas from the FCC process, wherein the wet gas comprises C2-C5+ materials,
fractionating the compressed wet gas to provide a vapor portion and a liquid portion,
combining the vapor portion and the liquid portion in a dividing wall column, wherein:
the dividing wall column comprises:
a vertical dividing wall dividing a top section of the column into a pre-fractionator section and a main fractionator upper section that is contiguous with a main fractionator lower section configured below the vertical dividing wall,
wherein the vapor portion and the liquid portion are combined in the pre-fractionator section,
fractionating the combined vapor portion and liquid portion in the pre-fractionator section to provide a C2− enriched overhead stream and a C3+ enriched fraction,
feeding the C3+ enriched fraction to the main fractionator lower section,
fractionating the C3+ enriched fraction in the main fractionator lower section and main fractionator upper section to provide a C3/C4 enriched overhead stream and a C5+ enriched bottoms stream,
recycling a first portion of the C5+ enriched bottoms stream to the pre-fractionator section, and
recovering a second portion of the C5+ enriched bottoms stream as the naphtha blend stock.

2. The method of claim 1, further comprises providing wild naphtha from a main fractionator of the FCC process to the pre-fractionator section.

3. The method of claim 1, wherein feeding the C3+ enriched fraction to the main fractionator lower section comprises heating the C3+ enriched fraction against the C5+ enriched bottoms stream in a side reboiler.

4. The method of claim 1, further comprising:
cooling the C3/C4 enriched overhead stream to provide a cooled C3/C4 enriched material,
returning a first portion of the cooled C3/C4 enriched material to the main fractionator upper section, and
providing a second portion of the cooled C3/C4 enriched material to a liquified petroleum gas (LPG) treating facility.

5. The method of claim 1, wherein fractionating the C3+ enriched fraction comprises reboiling a portion of the C3+ enriched fraction from a bottom tray of the dividing wall column in a first reboiler and returning the reboiled C3+ enriched fraction to a sump of the dividing wall column.

6. The method of claim 5, wherein the first reboiler heats the portion of the C3+ enriched fraction against light cycle oil (LCO) from the FCC process.

7. The method of claim 5, further comprising heating a portion of the C3+ enriched fraction from the sump against heavy cycle oil (HCO) from the FCC process in a second reboiler.

8. The method of claim 1, further comprising chilling the first portion of the C5+ enriched bottoms stream before recycling it to the pre-fractionator section.

9. The method of claim 1, further comprising fractionating the C2− enriched overhead stream in a secondary absorber column to provide a further enriched C2− fraction as an overhead stream and a C3+ enriched fraction as a bottom stream.

10. The method of claim 9, further comprising providing the further enriched C2− fraction to a fuel gas treating facility and providing the C3+ enriched fraction to a main fractionator of the FCC process.

11. The method of claim 1, wherein there is no condenser connected to the pre-fractionator section.

12. The method of claim 1, wherein there is only a single condenser connected to the dividing wall column, wherein the single condenser is connected to the main fractionator upper section.

13. A system for recovering naphtha blend stock from hydrocarbons produced in a fluid catalytic cracking (FCC) process, the system comprising:
a compressor configured to compress a wet gas from the FCC process, wherein the wet gas comprises C2-C5+ materials,
a separator drum configured to fractionate the compressed wet gas to provide a vapor portion and a liquid portion,
a dividing wall column comprising a vertical dividing wall dividing a top section of the column into a pre-fractionator section and a main fractionator upper section that is contiguous with a main fractionator lower section configured below the vertical dividing wall, wherein the system is configured so that:
the vapor portion and the liquid portion are combined in the pre-fractionator section,
the combined vapor portion and liquid portion are fractionated in the pre-fractionator section to provide a C2− enriched overhead stream and a C3+ enriched fraction,
the C3+ enriched fraction is fed to the main fractionator lower section, the C3+ enriched fraction is fractionated in the main fractionator lower section and main fractionator upper section to provide a C3/C4 enriched overhead stream and a C5+ enriched bottoms stream, a first portion of the C5+ enriched bottoms stream is recycled to the pre-fractionator section, and a second portion of the C5+ enriched bottoms stream is recovered as the naphtha blend stock.

14. The system of claim 13, wherein wild naphtha from a main fractionator of the FCC process is provided to the pre-fractionator section.

15. The system of claim 13, comprising a side reboiler configured to heat the C3+ enriched fraction against the C5+ enriched bottoms stream before the C3+ enriched fraction is fed to the main fractionator lower section.

16. The system of claim 13, further comprising:
a condenser configured to cool the C3/C4 enriched overhead stream to provide a cooled C3/C4 enriched material, and
a reflux drum configured to receive the cooled C3/C4 enriched material, wherein the system is configured to:
return a first portion of the cooled C3/C4 enriched material to the main fractionator upper section, and
provide a second portion of the cooled C3/C4 enriched material to a liquified petroleum gas (LPG) treating facility.

17. The system of claim 13, further comprising a first reboiler configured to heat a portion of the C3+ enriched fraction from a bottom tray of the dividing wall column and return the heated C3+ enriched fraction to a sump of the dividing wall column.

18. The system of claim 17, wherein the first reboiler heats the portion of the C3+ enriched fraction against light cycle oil (LCO) from the FCC process.

19. The system of claim 17, further comprising a second reboiler configured to heat a portion of the C3+ enriched fraction from the sump against heavy cycle oil (HCO) from the FCC process in a second reboiler.

20. The system of claim 13, further comprising a chiller configured to chill the first portion of the C5+ enriched bottoms stream before recycling it to the pre-fractionator section.

21. The system of claim 13, further comprising a secondary absorber column configured to fractionate the C2− enriched overhead stream to provide a further enriched C2− fraction as an overhead stream and a C3+ enriched fraction as a bottom stream.

22. The system of claim 21, wherein the further enriched C2− fraction is provided to a fuel gas treating facility and the C3+ enriched fraction is provided to a main fractionator of the FCC process.

23. The system of claim 13, wherein there is no condenser connected to the pre-fractionator section.

24. The system of claim 13, wherein there is only a single condenser connected to the dividing wall column, wherein the single condenser is connected to the main fractionator upper section.

* * * * *